June 11, 1946. W. H. NEWELL 2,402,073
IRREVERSIBLE DRIVE
Filed Feb. 25, 1942 2 Sheets-Sheet 1

INVENTOR
William H. Newell
BY
ATTORNEY

Patented June 11, 1946

2,402,073

UNITED STATES PATENT OFFICE 2,402,073

IRREVERSIBLE DRIVE

William H. Newell, New York, N. Y., assignor to Ford Instrument Company, Inc., Long Island City, N. Y., a corporation of New York Application February 25, 1942, Serial No. 432,199

3 Claims. (Cl. 192—8)

This invention relates to devices for use in power transmissions which will absorb excessive reactions and prevent them from being transmitted to the source of power. Such devices are popularly known as anti-kick-back devices.

More particularly this invention relates to that class of such devices which permit of power actuation in either direction and will operate in both directions to prevent predominant reactive forces from reaching the power source.

A primary object of the invention is to provide a mechanical construction for the purpose which is simple and of few parts, positive and reliable in its action, which requires no appreciable backward movement of parts to become effective, and which will be durable and rugged in use.

The invention is suitably embodied in a drive in which the transmission between the driving and driven shafts includes a pair of oppositely acting one-way brakes for engaging a stationary, force absorbing device, which brakes are normally engaged in the absence of a driving force, but which are selectively disengaged by initial movement of the driving shaft to free the transmission for movement in the direction of the driving shaft. The brake which restrains movement in the opposite direction remains active to check incipient movement in that direction.

Specifically the invention contemplates brakes in the nature of free-wheeling clutches for this purpose, in which eccentric brake elements carried by a transmission gear coact with a stationary drum prepared to grip and absorb adverse impulses. Springs urge the brake elements in engaging direction and members carried by the driving shaft are adapted to oppose the springs and move one or the other element out of engaging relation with the drum, depending upon which direction the shaft turns.

The invention includes other features as will appear from the following description of the illustrated embodiment of the invention.

Figure 1:
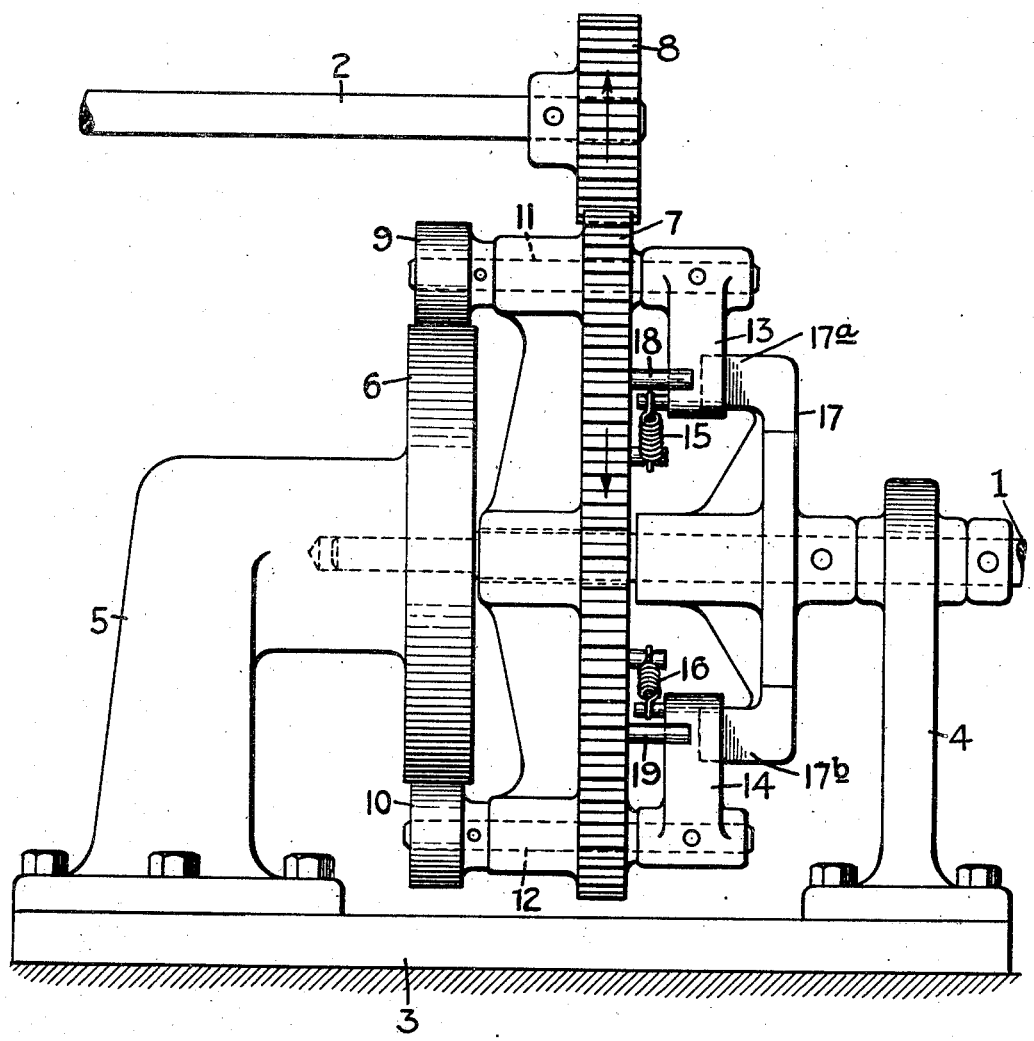
Fig. 1 is an end elevation of a mechanism embodying the invention.

The driving shaft 1 is connected to transmit rotation in either direction to the driven shaft 2. To the base 3 are fixed a standard 4 and a column 5. The column at its upper end has a horizontal extension that terminates in drum member 6 opposing and spaced from the standard 4. The standard has a bearing near its upper end in alinement with the axis of the drum which is also bored to provide a bearing, and the driving shaft bears in these two bearings. Collars on the shaft on opposite sides of the standard restrain the shaft against longitudinal movement.

A large gear 7 has an axial hub and is loosely mounted on the shaft 1 adjacent the drum, and meshes with a gear 8 on the shaft 2. The gear 7 carries one-way brake elements for engaging the drum 6 as will now be described.

The brake elements are of the type used in free-wheeling clutches in that they permit relative movement in one direction but wedge and lock to prevent movement in the opposite direction. In the form shown the brake elements are pivoted wedges 9 and 10 that have their pivotal axes eccentric to their contact surfaces so that they wedge against the drum in one direction and move free in the other. The brake elements 9 and 10 are fixed on shafts 11 and 12 that bear in diametrically opposite hubs near the outer edge of the gear 7, and extend beyond the opposite face of the gear. Short arms 13 and 14 are fixed on these extensions of the shafts 11 and 12, respectively, and coil springs 15 and 16 are attached to the ends of the respective arms and to pins on the gear face and urge the brake elements into braking relation with the drum.

Directional means are provided under the control of the driving shaft to rock one or the other of the brake elements free of the drum periphery as torque is applied to the shaft, depending on the direction of the torque. In the construction shown this is effected by a member 17 having a hub portion fixed on the shaft 1 and serving as one of the collars above referred to, and two oppositely extending arms 17a and 17b arranged in line and slightly offset from a diametral line so as to engage the arms 13 and 14, respectively, in more or less of a diametral line and on the sides toward which they are urged by the springs. Rotation of the shaft 1 will therefore through the medium of the arms 17a and 17b rotate either the arm 13 or arm 14 against their spring bias and so disengage that brake element.

Stop lugs or pins 18 and 19 are disposed on the face of the gear 7 immediately back of the arms 13 and 14, respectively, in position to engage those arms and limit their movement under the influence of the arms 17a and 17b.

Figure 2:
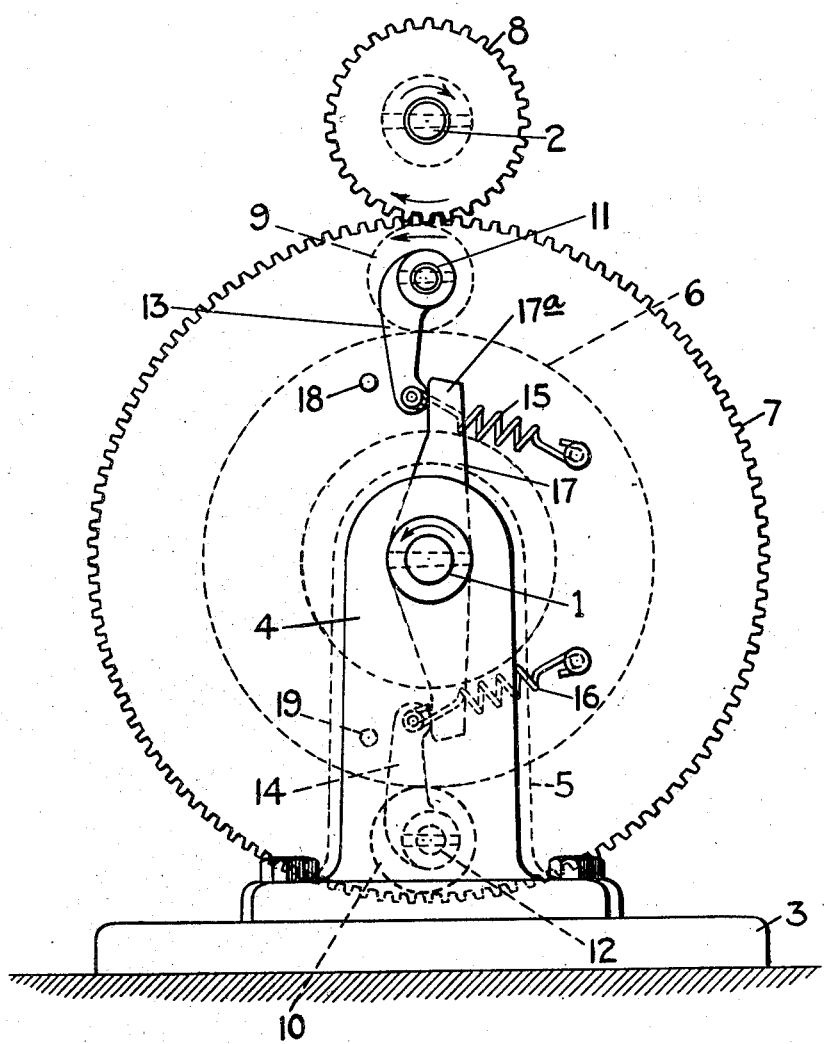
Fig. 2 is a side elevation of the same.

Assuming a torque upon the driving shaft in the direction indicated by the arrow in Fig. 2, the arm 17a will first release the brake element 9 by rotating the arm 13 clockwise relative to gear 7, and continued movement of the arm 17a will impart rotation to the gears 7 and 8 and driven shaft 2 in the directions indicated by the arrows, either by tension of the spring 15 or by engagement with the lug 18, depending on the load and the strength of the spring. Rotation of the shaft 1 in the opposite direction will of course release the brake element 10 and impart rotation to the gear 7. In either case the brake element not released remains ready and in position to grip the drum and brake a backward impulse upon the drive. Due to the eccentric mounting of the brake elements, the element not forcibly released slides freely over the surface of the drum in the direction of the drive with negligible drag resistance to the torque transmitted through the drive.

It is obvious that modifications may be made in the construction shown in the drawings and above particularly described within the principle and scope of the invention as defined in the following claims.

I claim:

1. A drive comprising in combination with a driving shaft and a driven shaft, transmission means between the two shafts including a gear, a fixed locking drum co-axial with the gear, two eccentrically mounted free-wheeling brake elements carried by the gear on angularly adjustable shafts in cooperative relation with the drum periphery, the two elements being in reverse phase relation, a radial arm on each element carrying shaft, a spring urging each arm in a direction to engage the associated element with the drum, and radial arms on the driving shaft positioned to alternately engage the element arms in a direction to oppose the stress of the springs.

2. A drive comprising in combination with a driving shaft and a driven shaft, a fixed locking drum co-axial with the driving shaft, a gear loosely mounted on the driving shaft adjacent the drum and geared to the driven shaft, two diametrically opposed brake shafts rotatively bearing in the gear, an eccentrically mounted free-wheeling brake element carried on each brake shaft in cooperative relation with the drum periphery, the elements being 180° out of phase, a radial arm on each brake shaft on the side of the gear opposite the brake element, a spring urging each arm in a direction to engage the brake element associated therewith and the drum, and oppositely extending arms carried by the driving shaft in position to alternately engage the radial arms in a direction to counteract the springs, said alternate engagement being effective to disengage the brake element opposing rotation of the driven shaft in the direction of rotation of the driving shaft.

3. A drive comprising in combination with a driving shaft and a driven shaft, a fixed locking drum co-axial with the driving shaft, a gear loosely mounted on the driving shaft adjacent the drum and geared to the driven shaft, two diametrically opposed brake shafts rotatively bearing in the gear, an eccentrically mounted free-wheeling brake element carried on each brake shaft in cooperative relation with the drum periphery, the elements being 180° out of phase, a radial arm on each brake shaft on the side of the gear opposite the brake element, a spring urging each arm in a direction to engage the brake element associated therewith and the drum, a stop lug on the gear back of each arm in position to limit movement against the spring tension, and oppositely extending arms carried by the driving shaft in position to alternately engage the radial arms on the side toward which they are urged by the springs.

WILLIAM H. NEWELL.